Feb. 3, 1959  J. KAPLAN ET AL  2,872,578
ELECTRO-MECHANICAL RESONANT SYSTEM
Filed Oct. 25, 1954  2 Sheets-Sheet 1

INVENTORS
JACK KAPLAN
FRANK T. TURNER
BY
ATTORNEYS

Feb. 3, 1959   J. KAPLAN ET AL   2,872,578
ELECTRO-MECHANICAL RESONANT SYSTEM
Filed Oct. 25, 1954   2 Sheets-Sheet 2

INVENTORS
JACK KAPLAN
FRANK T. TURNER
BY
Eyre, Mann & Burrows
ATTORNEYS

United States Patent Office 2,872,578
Patented Feb. 3, 1959

2,872,578

ELECTRO-MECHANICAL RESONANT SYSTEM

Jack Kaplan, Brooklyn, and Frank T. Turner, Hampton Bays, N. Y.

Application October 25, 1954, Serial No. 464,520

12 Claims. (Cl. 250—36)

The present invention relates to electro-mechanical resonant systems and comprises a novel system of this type which is self-excited and self-sustaining. As the invention is particularly adapted for use in ultrasonic machining operations it will be described with reference thereto. The principle of the invention is not, however, limited to such specific application.

In ultrasonic machining, high frequency longitudinal vibrations are set up in a tool and tool holder attached to an electro-mechanical transducer and maximum amplitude of vibration at the working end of the tool is obtained when the frequency is such that the overall length of tool, tool holder and transducer is approximately equal to an integral number of half wavelengths of the compressional waves set up therein. Thus, for optimum performance, the frequency of the electrical oscillations delivered to the transducer should be correlated to the mechanical part of the system. This means that the frequency of the electrical part of the system should change with tool and with tool wear, with change in temperature and with change in loading.

In prior art ultrasonic systems the electrical part of the system ordinarily included a variable frequency alternator or oscillator and attempts were made to adjust the frequency of such oscillator or alternator when a change in frequency was required to correlate the electrical and mechanical parts of the system. Such adjustment of the frequency of the oscillation generator was done either by the operator or automatically under control of a feedback signal obtained by use of a pickup coupled to the mechanically vibrating part of the system. In such prior art systems, whether manually controlled or automatically controlled, a certain amount of hunting necessarily resulted. Moreover, when a pickup was employed extra equipment was required at the transducer and the system was subject to error when high powered units were involved due to direct coupling between the energizing coil and pickup. Moreover, when a pickup is employed the spacing of parts is critical as minute displacements can introduce errors into the system.

In accordance with the present invention the entire system including the electro-mechanical transducer is so constructed as to comprise a self-excited oscillator with the transducer comprising part of the frequency determining element of the oscillatory system. We have found that a system can be made to oscillate at or near the desired optimum frequency when a feedback signal varying with the impedance of the transducer is provided. The feedback signal may vary with the voltage across the transducer or with the current through the transducer and provided there is sufficient gain and that proper phase shift is introduced into the feedback line the system will oscillate at the desired frequency, the frequency automatically shifting with change in impedance of the transducer indicative of tool wear or the like. By utilizing the transducer impedance for creation of a feedback signal no external pick-up need be employed.

For a better understanding of the invention and of the underlying theory thereof reference may be had to the accompanying drawings of which:

Fig. 3 is a circuit diagram representing another and simpler embodiment of the invention.

Figure 1:
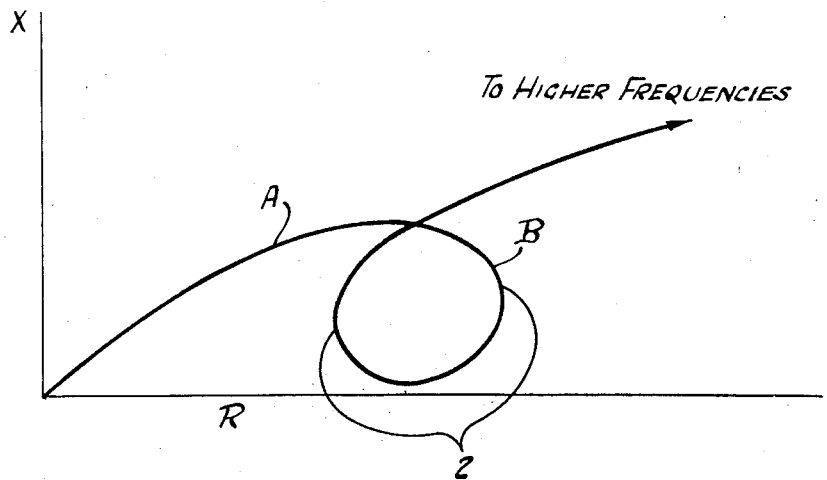
Fig. 1 is a qualitative representation of the complex electrical impedance of a magnetostrictive transducer for use in explaining the invention.

If a single mode of mechanical resonance is considered, the complex impedance of a magnetostrictive transducer with increasing frequency may be qualitatively represented by the curve A of Fig. 1 in which the ordinates represent reactance and the abscissae represent resistance. In the graph, harmonic frequencies are not represented and the reactive impedance of the transducer is taken to be primarily inductive, which is ordinarily the case when the transducer is a magnetostrictive transducer. A vector drawn from the origin to any point of the curve A represents the magnitude and phase angle of the impedance at the frequency corresponding to that point. We have determined that the frequency of maximum tool amplitude lies somewhere within the region indicated by the bracket 2 on the loop B described by the curve A. Hence, by inserting in the feedback path of the electrical system a voltage varying with the magnitude of the impedance and of a phase correlated to the phase angle of the impedance at a point within the desired range, oscillation of the system will result and the frequency will be such as to insure operation of the system at or near resonance.

Figure 2:
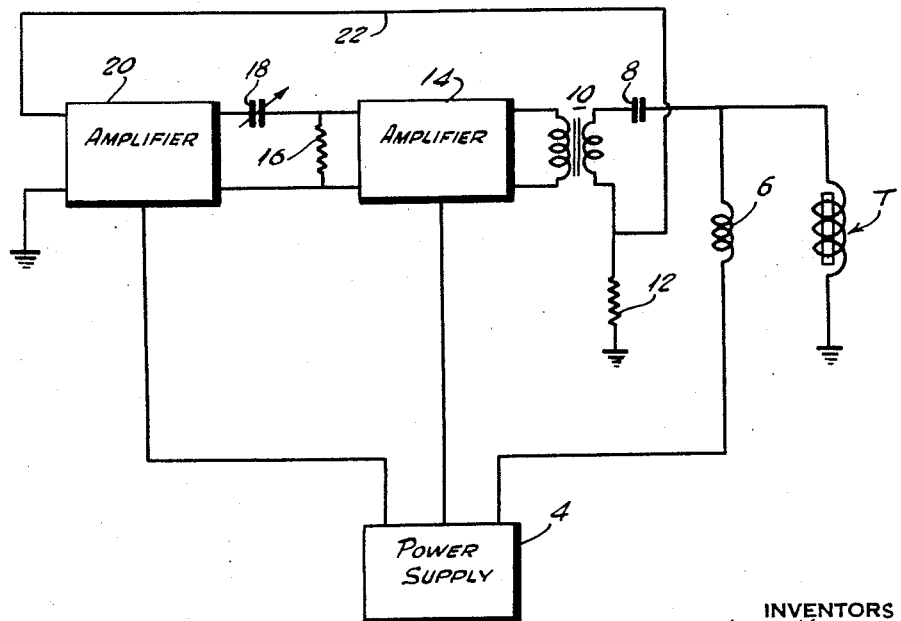
Fig. 2 is a circuit diagram representing one embodiment of the invention.
Figure 5:
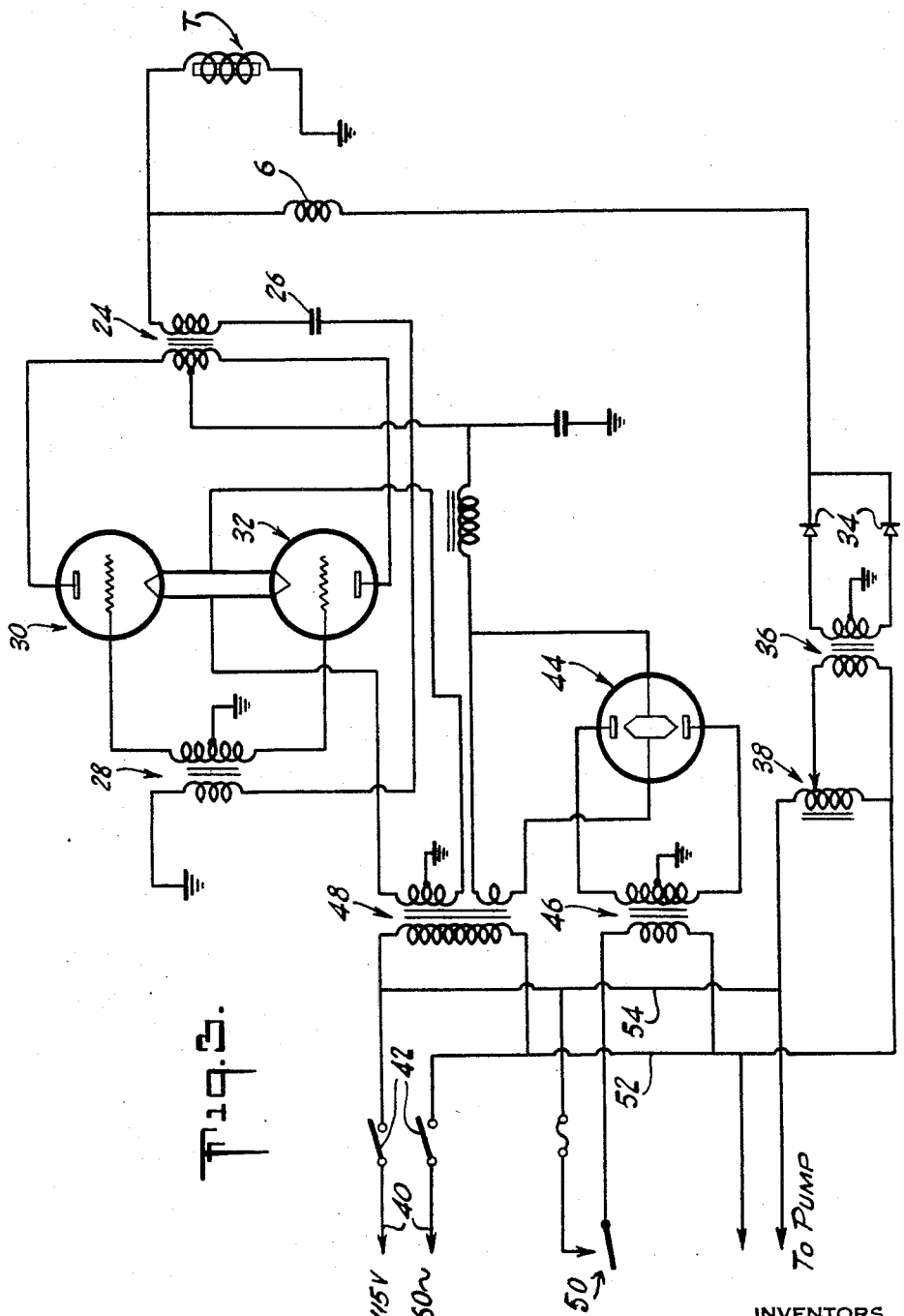

The circuit diagram of Fig. 2 to which reference may now be had represents one embodiment of the invention as applied to a system including a magnetostrictive transducer. In the drawing the transducer is diagrammatically illustrated at T. D. C. bias current from a suitable power supply 4 is supplied to the transducer through a coil 6. The ungrounded end of the energizing winding of the transducer is connected through a capacitor 8 to one end of the secondary of a transformer 10, the other end of which is connected to ground through an impedance 12. The primary winding of transformer 10 is connected to the output of an amplifier 14, the input of which is connected across a resistor 16 forming part of a phase shifting network. The phase shifting network includes in addition to the resistor 16 a variable capacitor 18 which is connected in series with the resistor 16 across the output of an amplifier 20. One input terminal of the amplifier 20 is grounded and the other is connected by a lead 22 to the ungrounded end of impedance 12. Thus a voltage varying with the current through the transducer T is impressed through the feedback connection 22 upon the amplifier 20.

By proper adjustment of the capacity of capacitor 18 and of the bias current delivered to the transducer T through the coil 6 the circuit of Fig. 2 may be made to break into oscillation at or near the frequency of maximum amplitude of the transducer and the frequency of such oscillation will automatically shift with change in transducer impedance. Adjustment of capacitor 18 affects the phase of the feedback signal impressed upon amplifier 14 whereas adjustment of the bias current affects the impedance of the transducer and therefore both the phase and magnitude of the feedback signal.

The circuit of Fig. 2 has been found very versatile in that it may be employed with both high and low powered units and with transducers and tool holders of various dimensions.

The simpler circuit of Fig. 3 was designed with particular reference to a relatively small transducer, tool holder and tool combination, such, for example, as might be employed in a dental unit. The system of Fig. 3 requires substantially less equipment than that of Fig. 2 and is reliable and accurate in operation.

In the circuit of Fig. 3 the ungrounded end of the winding of transducer T is connected to one end of the secondary of a transformer 24 and the other end of that secondary is connected through a capacitor 26 and the primary winding of a transformer 28 to ground. The secondary of transformer 28 is grounded at its mid point and connected at its ends to the control grids of two triodes 30 and 32. The anodes of the triodes 30 and 32 are connected across the primary of transformer 24. Thus the primary winding of transformer 28 carries the transducer current and the voltage thereacross will vary with the current through the transducer. As in the circuit of Fig. 2, D. C. bias current for the transducer is supplied through the coil 6. In Fig. 3 the power supply for the D. C. bias current comprises a pair of rectifiers 34 connected to opposite ends of the center grounded secondary of a transformer 36, the primary of which is connected to an auto transformer 38 energized from 115 volt 60 cycle power lines 40 under control of a switch 42. Rectified and filtered voltage for the anodes of tubes 30 and 32 is obtained from a rectifier 44 energized from the power lines 40 through a transformer 46 and filament current for tubes 30 and 32 is obtained from one secondary winding of a transformer 48, the primary of which is also energized from the power lines 40. A separate secondary winding on transformer 48 supplies the filament current for the rectifier 44. The primary of transformer 46 is connected across the power lines 40 through an additional switch 50 which may be, and preferably is, a foot operated switch. Thus the supply of oscillatory current to the transducer may be cut off at will by an operator manipulating switch 50 and this is of particular value when the transducer forms part of an ultrasonic dental tool. In ultrasonic machining, as described in Patent No. 2,580,716 to Lewis Balamuth, cutting is done by an abrasive suspended in liquid and interposed between the vibrating tool end and the workpiece. When the transducer is a magnetostrictive transducer it may be desired to circulate cooling water thereabout to prevent overheating. As indicated in Fig. 3 a pump for circulating the cooling fluid and/or the fluid carrying the abrasive can be energized from lines 52 and 54 connecting transformer 38 to the main switch 42.

In operation, assuming no major variation in dimensions of the mechanical part of the system, the only adjustment required to start and maintain oscillation of the circuit of Fig. 3 is that of the bias current, and such may be made by change in position of the movable tap on auto-transformer 38, or, if preferred, a variable resistor could be inserted in the line from the rectifiers 34 to the coil 6. If the differences in the tool and tool holder assemblies to be used with the system of Fig. 3 are substantial, the windings of transformers 28 and 24 could be provided with taps for selection of optimum numbers of turns for the primary and secondary windings thereof and means could be provided for replacing capacitor 26 by one or more different capacitors.

From the foregoing description of two embodiments of the invention it will be apparent that we have provided a simple and efficient self-excited electro-mechanical system in which oscillations are automatically sustained at or near resonance irrespective of change in dimensions or of loading of the mechanical part of the system. In each case the electro-mechanical transducer determines in part the frequency of the system and a voltage varying with the electrical impedance thereof is fed back to provide the output-input loop for initiating and sustaining oscillations. Although in the specific embodiments of the invention illustrated in the drawings, the current through the transducer was utilized to produce the feedback voltage, the invention in its broadest aspects is not limited to such specific arrangement. Also, although in the specific embodiments illustrated the power output was shown as fixed, obviously means could be provided for adjusting or varying the power output of the circuit. Preferably D. C. bias current is employed and therefore in the circuits of Figs. 2 and 3 direct current sources for the bias current were indicated. Nevertheless the invention is not limited to the use of such type of bias current as alternating current bias current could be employed.

In the described specific embodiments of the invention, the reactive impedance of the transducer is primarily inductive and therefore the feedback path includes capacitative phase shift means. Obviously, when the reactive impedance of the electro-mechanical transducer is primarily capacitative, inductive phase shift means could and would be included in the feedback path. Although the invention has been described with specific reference to ultrasonic machining, the principle thereof is not dependent upon any particular field of utility of the generated mechanical vibrations.

The following is claimed:

1. An electro-mechanical resonant system comprising a source of electrical power, a magnetostrictive transducer having an energizing winding connected to said source for receipt of bias current therefrom, an amplifier energized from said source and having input and output terminals, an output transformer having primary and secondary windings, the primary winding of said output transformer being connected across the output terminals of said amplifier, means coupling the secondary of said output transformer to the energizing winding of said transducer, and feedback and phase shifting means for impressing across the input terminals of said amplifier a voltage varying with the current through the winding of said transducer to cause oscillation of the system substantially at resonance.

2. A self-starting electro-mechanical resonant system comprising a source of electrical power, a magnetostrictive transducer having an energizing winding, adjustable means for delivering bias current from said source to said winding, an amplifier energized from said source and having input and output terminals, an input transformer having a primary and secondary winding, said secondary winding being connected across the input terminals of said amplifier, an output transformer having a primary and a secondary winding, the primary winding of said output transformer being connected across the output terminals of said amplifier, and a circuit including phase shifting means connecting one end of the primary winding of said input transformer through the secondary winding of said output transformer to one end of said transducer winding, the other ends of said transducer winding and input transformer primary winding being connected together.

3. The system according to claim 2 wherein the reactive impedance of said transducer is primarily inductive and the phase shifting means in said connecting circuit comprises a capacitor.

4. The system according to claim 3 wherein said capacitor is interposed between the primary winding of said input transformer and the secondary winding of the output transformer.

5. A self-starting electro-mechanical resonant system comprising a source of electrical power, a magnetostrictive transducer having an energizing winding, means for delivering bias current from said source to said winding, an amplifier energized from said source and having input and output terminals, an output transformer having a primary and a secondary winding, the primary winding of said output transformer being connected across the output terminals of said amplifier, the secondary winding of said output transformer being connected at one end through a capacitor to one end of said transducer winding and at its other end to ground through an impedance, and circuit means for impressing across the input terminals of said amplifier a voltage varying with the voltage across said impedance, said circuit means including amplifying and phase shifting means.

6. The system according to claim 5 wherein the reactive impedance of said transducer is primarily inductive and the phase shifting means of said circuit means comprise a variable capacitor.

7. The system according to claim 5 wherein said circuit means comprise an amplifier having input terminals connected across said impedance and output terminals connected across a series circuit comprising a variable capacitor and a resistor, said last mentioned amplifier comprising the amplifying means of said circuit means and said variable capacitor comprising the phase shifting means, the input terminals of said first mentioned amplifier being connected across said resistor.

8. A self-excited oscillatory system for acoustical power generation including in combination, power amplifying means, an electro-mechanical transducer having a single energizing winding driven by said power amplifying means and serving as a part of the frequency determining element of the system, means connected to the input end of said winding operative to feed back to the input of the power amplifying means a voltage varying with the current through the transducer to thereby maintain oscillation of the system substantially at resonance, and means for shifting the phase of the feedback voltage.

9. An electro-mechanical resonant system including, a magnetostrictive transducer having a single energizing winding and an electric power amplifying circuit connected to said winding and operative to supply a bias current to said winding which consists of a direct current component having a superimposed alternating current component, said power amplifying circuit having means connected to the input end of said winding operative to feed back through said winding a voltage which varies with the alternating current component of said bias current and thereby maintain the oscillations of the system substantially at resonance.

10. An electro-mechanical resonant system including, a magnetostrictive transducer having a single energizing winding and an electric power circuit connected to said winding and operative to supply a bias current to said winding, said power circuit including means connected to the input end of said winding operative to feed back through said winding a voltage varying with said current and thereby maintain oscillation of the system substantially at resonance, and adjustable means for varying the impedance of said transducer to thereby vary the magnitude and shift the phase of the feedback voltage.

11. A self-excited oscillatory system for acoustical power generation including in combination, power amplifying means, an electro-mechanical transducer having a single energizing winding driven by said power amplifying means and serving as a part of the frequency determining element of the system, and means connected to the input end of said winding operative to feed back to the input of said amplifying means a voltage which varies with the impedance of the transducer to thereby maintain oscillation of the system substantially at resonance.

12. A self-excited oscillatory system for acoustical power generation including in combination, power amplifying means, an electro-mechanical transducer having a single energizing winding driven by said power amplifying means and serving as a part of the frequency determining element of the system, and means connected to the input end of said winding operative to feed back to the input of the amplifying means a voltage varying with the current through the transducer to thereby maintain oscillation of the system substantially at resonance.

References Cited in the file of this patent

UNITED STATES PATENTS

| | | |
|---|---|---|
| 1,811,128 | Harrison | June 23, 1931 |
| 1,937,333 | Dome | Nov. 28, 1933 |
| 1,982,341 | Hitchcock | Nov. 27, 1934 |
| 1,992,938 | Chambers et al. | Mar. 5, 1935 |
| 2,396,224 | Artzt | Mar. 12, 1946 |
| 2,676,236 | Birkbeck et al. | Apr. 20, 1954 |
| 2,683,856 | Kornei | July 13, 1954 |